Dec. 19, 1939.   J. M. HAIT   2,183,884
METHOD AND APPARATUS FOR CLASSIFICATION OF FRUITS AND FOODSTUFFS
Filed Aug. 23, 1937
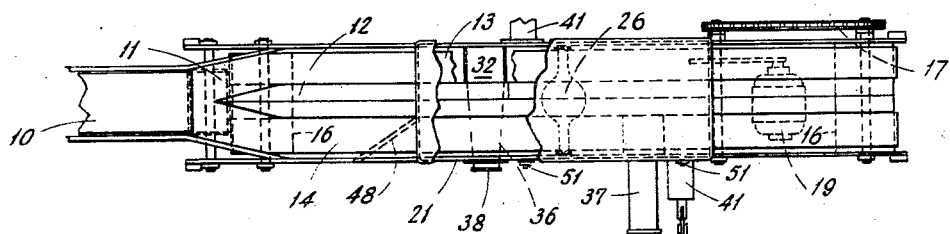
Fig. 1.
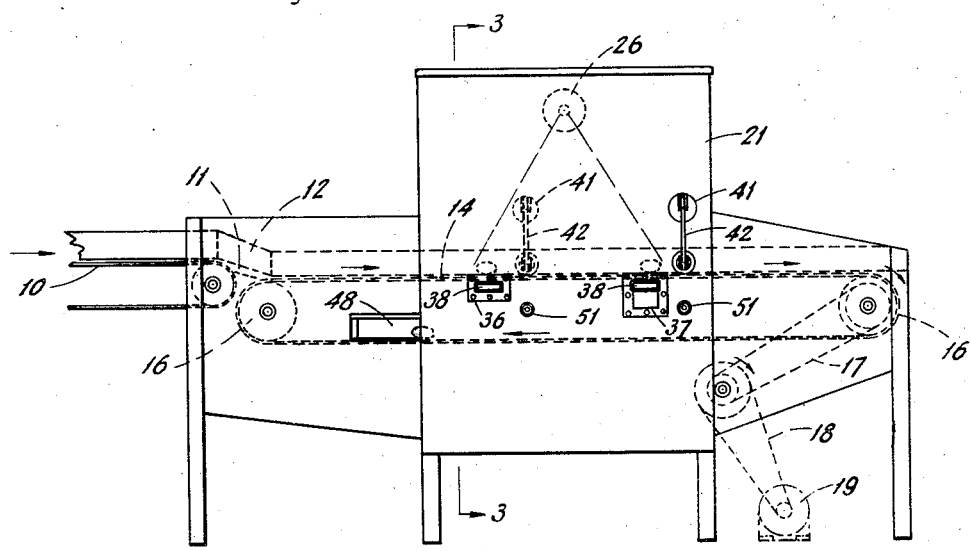
Fig. 2.
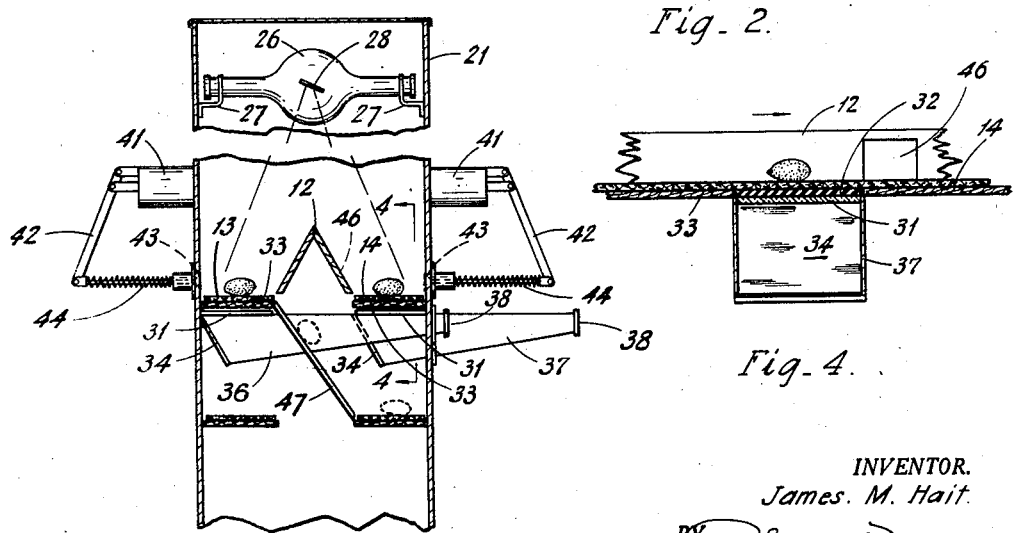
Fig. 3.
Fig. 4.
INVENTOR.
James. M. Hait.
BY Philip A. Minnis
ATTORNEY.

Patented Dec. 19, 1939

2,183,884

UNITED STATES PATENT OFFICE 2,183,884

METHOD AND APPARATUS FOR CLASSIFICATION OF FRUITS AND FOODSTUFFS

James M. Hait, Los Angeles, Calif., assignor to Food Machinery Corporation, San Jose, Calif., a corporation of Delaware Application August 23, 1937, Serial No. 160,441

13 Claims. (Cl. 250—52)

This invention relates to the provision of improved means and methods of inspecting and segregating various foodstuffs such as, for example, citrus fruit, avocados, melons, canned foodstuffs, etc., for the purpose of determining whether the foodstuff, fruit or vegetable is diseased, frozen, or otherwise impaired in quality as by fermentation, presence of impurities, cell degeneration, molds, or the like.

In many instances fruit, such as citrus fruit, for example, become diseased as by molds of the genus Alternaria, the destructive action extending through the stem end of the fruit and developing to a material extent within the fruit without any appreciable evidence of the disease from the exterior. Furthermore, in the event a citrus crop has been subjected to freezing weather at the wrong time of the year, it is difficult to segregate fruit which has been rendered woody by reason of the freezing temperatures from fruit which has not been deleteriously affected.

It has heretofore been proposed to examine small discrete objects, such as citrus fruit, avocados, or canned fruit, for the purpose of separating impaired objects from the mass, as disclosed, for example, in the co-pending application of Edward S. Rick, Serial No. 150,371, filed June 25, 1937, wherein a plurality of lines of objects may be examined simultaneously from a single X-ray tube.

Generally stated, the method disclosed therein contemplates subdividing a haphazard aggregation of fruit into orderly files which are then continuously advanced past zones of inspection, the files of fruit or other objects to be examined being subjected at such zones of inspection to X-ray emanations which upon passing through the fruit or objects are caused to impinge upon fluorescent screens to produce a visible image capable of being observed, such image definitely indicating the characteristics of the internal portions of the fruit or other object so that segregation of the undesired fruit or object from the moving file may be readily accomplished.

The present invention is generally similar to that described above, and relates to an improvement over heretofore known machines by providing for the passage of the X-rays through objects of irregular shape, such as lemons, in a direction transverse to their longitudinal axis whereby, irrespective of the position of the lemon on its support, a similar image will be obtained for all lemons, to enable accurate examination thereof.

It is an object of the invention, therefore, to provide improved apparatus for classifying fruits, vegetables, and the like in accordance with the presence or absence of internal impurities or characteristics.

Another object of the invention is to provide apparatus for inspecting and classifying objects or fruit of irregular outline, such as lemons, for example, to determine the presence of internal decay, cell degeneration, or other internal change.

Another object of the invention is to disclose a machine which is arranged to permit the passage of objects through a zone of fluoroscopic emanations without subjecting the operator to the X-ray emanations.

Another object of the invention is to provide a machine in which a plurality of files of objects can be examined from the same side of the machine so as to provide common conditions for all files being examined.

The foregoing, with other objects of the invention, will be apparent from the following detailed description of a preferred mode of operation, and of an illustrative form of apparatus as disclosed in the accompanying drawing, in which:

Fig. 1 is a plan view of the complete machine partially broken away to illustrate certain structure within the machine.

Fig. 2 is a side elevation of the machine.

Fig. 3 is a transverse vertical section taken in the plane of the line 3—3 in Fig. 2.

Fig. 4 is a fragmentary sectional elevation taken as indicated by the line 4—4 in Fig. 3.

As shown in Figs. 1 and 2, a mass of indiscriminately positioned objects, such as lemons, for example, may be fed to the machine as by a conveyor belt 10, the mass being discharged from the belt 10 over an inclined discharge chute 11, and is then split by means of the V-shaped rail or partition 12 so as to feed two single files of fruit onto respective parallel conveyor belts 13 and 14. The belts 13 and 14 may be supported at their ends by suitable rollers 16, the right hand roller 16 of each belt in Fig. 2 being connected by chain and sprocket connections 17 and 18, with a motor 19 to provide a drive for the belts.

It will be understood that the machine is provided with a suitable framework to support the various rolls, conveyor belts, etc., and may include a housing 21 which is preferably provided with lead sheathing or lead walls to prevent the passage of X-ray emanations in undesired directions so as to impinge on the operators of the machine.

Centrally disposed within the housing 21 is an X-ray tube 26 which is supported by brackets 27 from the walls of the housing, and is supplied with the required high voltage current in the usual manner by suitable electrical means, which will be apparent to those skilled in the electrical arts, and are therefore not shown. The tube 26, as is well-known, has the property of discharging its rays in a fan-shaped beam which in a plane at right angles to the axis of the tube will subtend an arc of approximately 60° as indicated in Fig. 2, while in a plane containing the axis, the arc subtended will be substantially less as indicated in Fig. 3. Preferably, the tube 26 is mounted so that its anode or target 28 is located substantially midway and above the belts 13 and 14, a sufficient amount so that the emanations will cover objects carried by both the belts.

In order to view the images of the fruit as provided by the X-ray emanations, a pair of fluorescent screens 31 are mounted below and closely adjacent the belts 13 and 14 within the range of the X-rays immediately beneath respective belt supports and screen protectors 32 which are suitably mounted in the support 33 for the associated belt. Preferably, the plates 32 may be made of a material such as Bakelite or hardened rubber, which offers little obstruction to the passage of the X-rays whereby the best image possible will be obtained on the screen.

Below each of the fluorescent screens 31 an angularly disposed reflecting mirror 34 is provided to reflect the image of the fruit formed on the associated screen 31 through an associated inspection hood 36 and 37 as the case may be. Each of the hoods 36 and 37 is provided with a sight glass 38 which may be lead glass if desired, through which an operator when seated can view the respective images of the fruit on the screens. It will be noted that each of the sight windows 38 are the same distance from the associated mirror 34, and all fruit is at the same distance from its cooperating screen, whereby the same conditions of observation will obtain for both files or lines of fruit. Also, because the X-rays pass downwardly through the fruit onto the screens 31, elongated fruit such as lemons or the like, will always lie with its axis transverse to the direction of the X-ray emanations, and a similar image will be provided for all fruit, irrespective of their position on the belt.

Means are provided for selectively removing objects from the belts and such means may comprise a solenoid 41 operatively connected by a link 42 with a plunger 43 positioned in a direction transversely to the travel of the belts, and normally held in inoperative position by a spring 44. The plunger operates to eject fruit from the belt through an opening 46 in the adjacent wall of the guide member 12, an inclined chute 47 being provided whereby the ejected fruit from both belts is discharged onto the lower run of the belt 14 from which it may be removed in any suitable manner, as by a shunt 48.

Each solenoid 41 may be energized by means of a push button switch 51 (Fig. 2) suitably mounted on the housing 21. When the observer sees that the image on the fluorescent screen represents an undesired object, he closes a contact by means of the switch 51 to energize the solenoid 41 whereby the plunger 43 will operate to push the object off of the belt and onto the cull discharge conveyor.

From the above description, it will be seen that the apparatus disclosed herein provides a simple and advantageous arrangement for examining the interior of files of fruit or other discrete objects, particularly those of irregular outline, such as lemons and pears, and provides for like conditions of examination for all files of the objects.

While I have shown and described a preferred embodiment of the invention, it will be apparent to those skilled in the art that the invention is capable of both variation and modification from the form shown, and its scope, therefore, should be limited only by the scope of the claims appended hereto.

I claim:

1. In an apparatus for inspecting the internal structure of discrete objects, a source of X-ray emanations disposed to project the emanations downwardly, a plurality of fluorescent screens disposed below said source and in the path of the emanations therefrom, means for conveying objects between said source and said means, and means for positioning said objects in a plurality of single files on said conveying means.

2. In an apparatus for inspecting the internal structure of discrete objects, a source of X-ray emanations disposed to project the emanations downwardly, a plurality of fluorescent screens disposed below said source and in the path of the emanations therefrom, a plurality of conveyors for carrying objects between said source and said screens, and means intermediate said conveyors for positioning the objects in a single file on each one of said conveyors, said conveyors travelling closely adjacent an associated screen.

3. In an apparatus for inspecting the internal structure of discrete objects, a source of X-ray emanations disposed to project the emanations downwardly, a plurality of fluorescent screens disposed below said source and in the path of the emanations therefrom, means for conveying objects between said source and said screens, means cooperating with said conveying means for positioning said objects in a plurality of single files on said conveying means, and means including reflecting means associated with said screens for enabling viewing of said screens from locations out of the path of said emanations.

4. In an apparatus for inspecting the internal structure of discrete objects, a source of X-ray emanations disposed to project the emanations downwardly, a plurality of fluorescent screens disposed below said source and in the path of the emanations therefrom, a plurality of conveyors for carrying objects between said source and said screens, means intermediate said conveyors for positioning said objects in a single file on each one of said conveyors, each said conveyor travelling closely adjacent an associated screen, and means including reflecting means associated with said screens for enabling viewing of said screens from locations out of the path of said emanations.

5. In an apparatus for inspecting the internal structure of discrete objects, a source of X-ray emanations disposed to project the emanations downwardly, a plurality of fluorescent screens disposed below said source and in the path of the emanations therefrom, means for conveying a plurality of single files of objects between said source and said screens, a plurality of substantially horizontal inspection hoods having sight windows, and reflecting means between said hoods and said screens, said hoods being offset horizontally to locate said sight windows at a common distance from their associated reflecting means.

6. In an apparatus for inspecting the internal structure of discrete objects, a source of X-ray emanations disposed to project the emanations downwardly, a plurality of fluorescent screens disposed below said source and in the path of the emanations therefrom, a plurality of conveyors for carrying single files of objects between said source and said screens, each said conveyor travelling closely adjacent an associated screen, a plurality of substantially horizontal inspection hoods having sight windows, and reflecting means between said hoods and said screens, said hoods being offset horizontally to locate said sight windows at a common distance from their associated reflecting means.

7. In an apparatus for inspecting the internal structure of discrete objects, a source of X-ray emanations, a fluorescent screen below said source, conveying means for conveying objects between said source and said screen, a partition intermediate said conveying means for separating said objects into single files during their passage through the emanations of said source and above said screens, an inspection window, and reflecting means below said screen and related to said screen and said window to enable the images of objects on said screen to be viewed from said window.

8. In an apparatus for inspecting the internal structure of discrete objects, a source of X-ray emanations, a fluorescent screen, means for conveying a file of objects between said source and said screen, means for supporting said conveying means above said screen and out of contact therewith including a plate of "Bakelite" or the like interposed between said conveying means and said screen, and means for enabling the inspection of images cast on said screen by objects on said conveying means.

9. In an apparatus for inspecting the internal structure of discrete objects, a source of X-ray emanations, a fluorescent screen, means for conveying a file of objects between said source and said screen, means for supporting said conveying means above said screen and out of contact therewith including a plate of "Bakelite" or the like interposed between said conveying means and said screen, an inspection window at a side of the apparatus, and reflecting means for enabling viewing of said screen from said window.

10. In an apparatus for inspecting the internal structure of discrete objects, a source of X-ray emanations, a pair of fluorescent screens below said source, a pair of conveyors for carrying single files of objects on the upper stretches thereof between said source and said screens, means for removing objects from said conveyors, and means for delivering the objects removed from both of said conveyors to the lower stretch of one of said conveyors.

11. In an apparatus for inspecting the internal structure of discrete objects, a source of X-ray emanations, a pair of fluorescent screens below said source, a pair of conveyors for carrying single files of objects on the upper stretches thereof between said source and said screens, a pair of horizontally disposed inspection hoods at the same side of said apparatus, and reflecting means between each screen and the associated hood, the inspection hood associated with one of said conveyors extending between the upper and lower stretches of the other of said conveyors.

12. In an apparatus for inspecting the internal structure of discrete objects, a plurality of conveyors for carrying single files of objects thereon, a source of X-ray emanations intermediate said conveyors and above the same, and a plurality of fluorescent screens disposed below said conveyors and in the path of the emanations of said source.

13. In an apparatus for inspecting the internal structure of discrete objects, a plurality of conveyors for carrying single files of objects thereon, a source of X-ray emanations intermediate said conveyors and above the same, a plurality of fluorescent screens disposed below said conveyors and in the path of the emanations of said source, each of said conveyors travelling closely adjacent an associated screen, a plurality of inspection hoods below said conveyors, and reflecting means between said hoods and said screens.

JAMES M. HAIT.